W. C. ROBINSON.
SYSTEM FOR DISPOSAL OF BILGE WATER AND RECOVERY OF SLUDGE.
APPLICATION FILED FEB. 9, 1922.
1,425,289.
Patented Aug. 8, 1922.
3 SHEETS—SHEET 1.
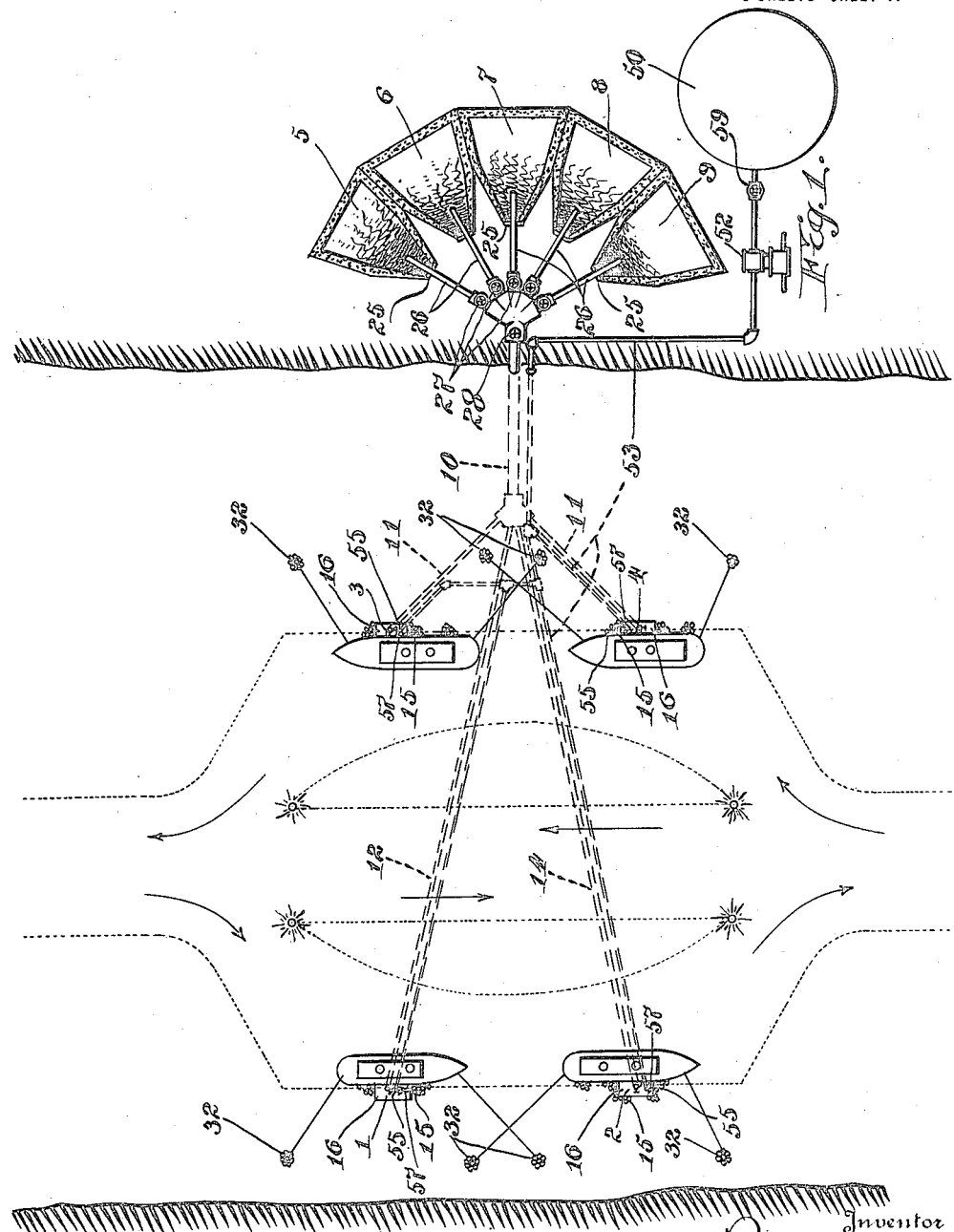

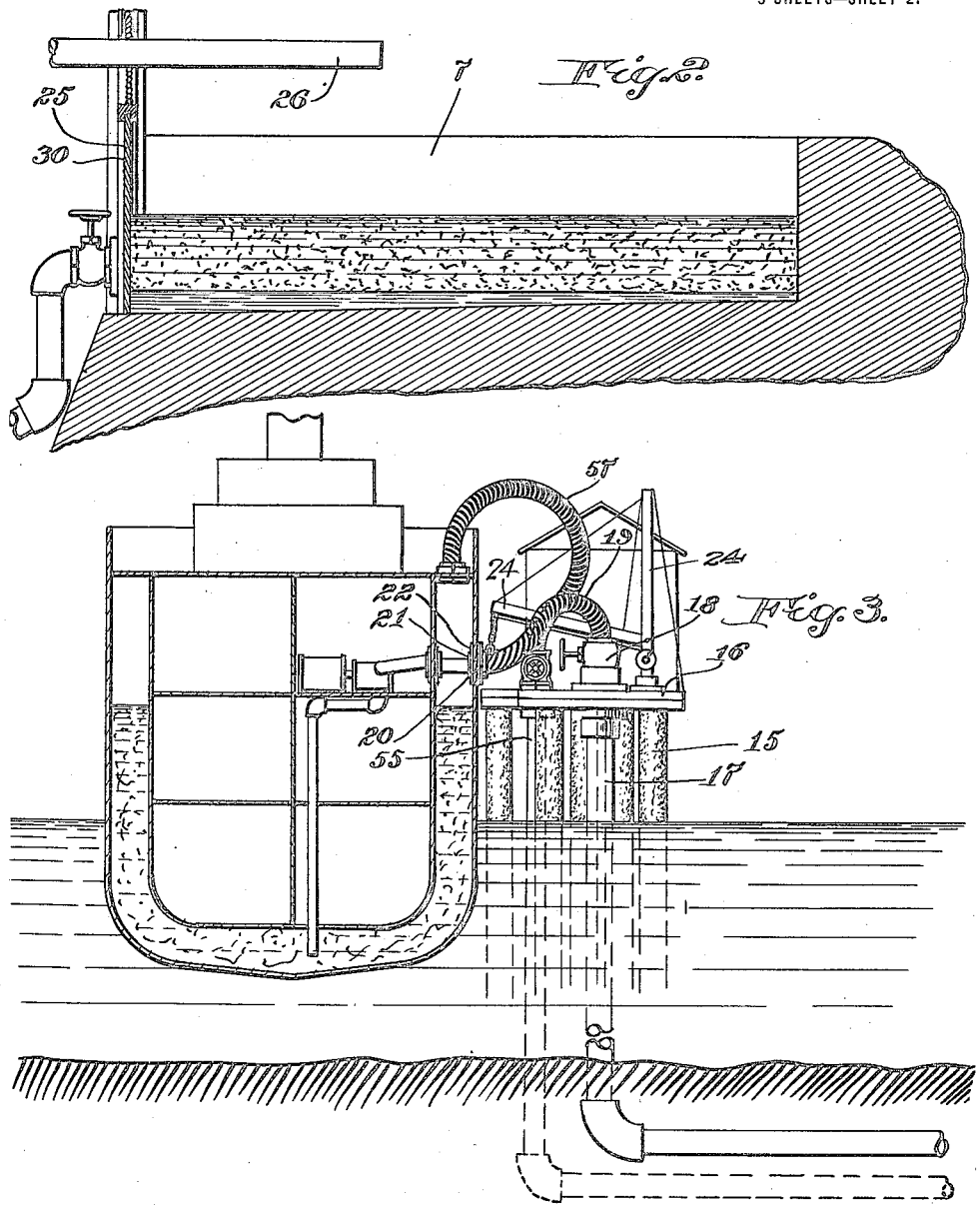

W. C. ROBINSON.
SYSTEM FOR DISPOSAL OF BILGE WATER AND RECOVERY OF SLUDGE.
APPLICATION FILED FEB. 9, 1922.
1,425,289. Patented Aug. 8, 1922.
3 SHEETS—SHEET 3.
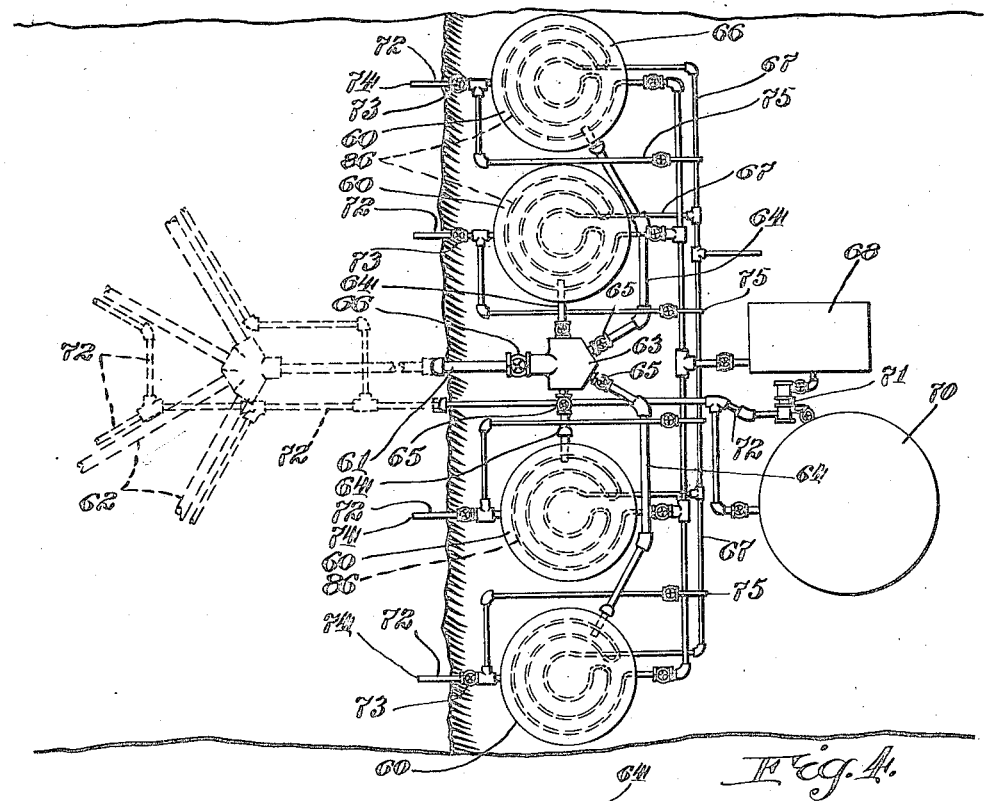
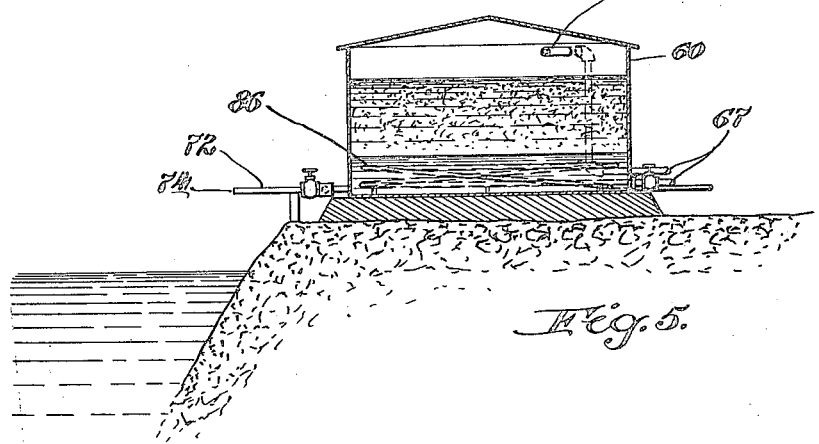

UNITED STATES PATENT OFFICE.

WILLIAM C. ROBINSON, OF BALTIMORE, MARYLAND.

SYSTEM FOR DISPOSAL OF BILGE WATER AND RECOVERY OF SLUDGE.

1,425,289.　　　　　Specification of Letters Patent.　　Patented Aug. 8, 1922.

Application filed February 9, 1922.　Serial No. 535,193.

*To all whom it may concern:*

Be it known that I, WILLIAM C. ROBINSON, a citizen of the United States of America, residing in the city of Baltimore, State of Maryland, have invented certain new and useful Improvements in Systems for Disposal of Bilge Water and Recovery of Sludge, of which the following is a specification.

The harmful results incident to the presence on the surface of the water in and in the vicinity of all harbors, rivers, ports and landing places where oil burning boats bunker with oil of refuse and oil of sludge discharged with the bilge water, are generally recognized. This sludge is not only unsightly in appearance but harmful in its effect in that it kills wild fowl, fish and the like, fouls the sides of ships and boats and is objectionable to bathers making use of beaches and water fronts in the vicinity of ports frequented by oil burning boats. The increase of fire hazard on this account is also an important matter on account of accumulation of this combustible material on piling docks, bridges, etc.

The fuel oil for each oil burning boat is carried in bunkers usually in an inter wall space the sides and bottom of the ship being usually made double and it serves as ballast. In order to maintain a substantially constant ballasting effect the oil as it is withdrawn and consumed is replaced by sea water, the remaining supply of oil floating on the water which is understood to be of considerably greater specific gravity. In accordance with this practice the oil withdrawn for consumption is taken from the top of the bunker or tank so that no water will pass to the furnaces or engines until the supply of oil is exhausted. When the boat reaches a port where a supply of oil for consumption in propelling the ship is to be obtained, the bilge water, i. e., the water in the bunkers is discharged to make room for the new supply of oil. The bilge water discharged under these circumstances carries with it a considerable amount of oily, greasy, tarry material, partly plain unconsumed oil, partly emulsion due to the mixing of the oil and the water, partly tarry matter and other products due to the action of the chemicals in the sea water on the oil.

This material is not only objectionable as foresaid if released and allowed to spread and float on the surface of the water but is of considerable value if recovered. However, no practically operative system has so far as the records show ever been devised for these purposes.

The object of the invention is to provide such a system and the invention relates to a method and apparatus for disposing of the bilge water and recovering the sludge from the bilge water of oil burning boats. The method may also be applied to oil carrying boats in which the tanks are in some instances filled with water on the return voyage to give the boat the desired trim.

In the accompanying drawing I have illustrated a bilge water discharging and sludge recovering system embodying my invention.

In the drawings:

Figure 1 is a plan of the entire system, more or less diagrammatic in nature;

Figure 2 is a vertical, longitudinal section through a settling basin;

Figure 3 is a transverse section through a ship showing the oil bunkers the boat being in operative relation with a discharging station for removing the bilge water from the boat and transferring it to the settling basins.

Fig. 4 is a plan and Fig. 5 an elevation of a slightly modified form of the invention having particular reference to the settling tanks or receptacles.

Referring to the drawings by numerals the sludge recovering system as illustrated consists of pumping stations 1—2—3—4 adjacent the channel, i. e., at points conveniently accessible to the oil burning boats, settling receptacles in the form of basins or tanks 5—6—7—8—9 on the shore substantially opposite the pumping stations and piping 10 with suitable branch pipes 11—12—14 connecting the respective pumping stations with the basins.

The discharging stations shown are located adjacent the channel or other deep water point accessible to the boats, these discharging stations may to advantage be located over the water on piling 15 and each station as shown includes a suitable platform or floor 16 and a riser or upright pipe 17, leading from one of the pipes 10, 11, 12, to the platform 16 where it is preferably controlled by valve 18 and is provided with a flexible hose 19 terminating at its free end in a coupling 20 adapted to be joined to the discharge or delivery 21 of the bilge pump which carries a corresponding fitting 22. Each discharge station may to advantage also include a derrick or similar appliance 24 for handling the flexible pipe or hose 19 which is of considerable weight.

To avoid interference with navigation the pipes 10, 11, 12, 14, are preferably sunk beneath the bottom of the channel where they will not come in contact with the hulls of vessels and will not be caught by anchors though this latter contingency may be avoided where the pipes are laid on the bottom by posting in accordance with the present practice where there are cables and pipes on the bottom of navigable water.

While sunken pipes are preferably used, piping floated on or otherwise supported on or above the surface of the water may be used within the scope of the invention where interference with navigation or extra expense involved are not prohibitive.

Settling basins 5, 6, 7, 8, 9, are shown as located on the shore opposite the discharge stations. These are shown substantially triangular in plan though tanks or basins of other shape may be used. In the system shown the apex 25 of each basin is slightly flattened or blunted and turned toward the water, i. e., toward the nearest discharging station and each basin is connected by a pipe 26 with the main pipe 10, the pipes 26 being preferably controlled by valves 27 and the main pipe by valve 28. The pipes 26 as shown on entering the basins are passed each over the top of the wall or gate near the vertex or end 25, though this arrangement is not essential and the bottom or floor of each basin is inclined downward toward the outlet which in this instance is at the vertex and the basins are preferably, though not essentially porous as to their walls.

The vertex of each basin as shown is closed by a gate 30 which opens from the bottom, i. e., the gates are mounted to slide in a vertical direction and opened by lifting, though any suitably controlled outlet near the bottom of the basin would serve the purpose intended as hereinafter described.

The basins may be of either concrete or any preferred construction, porosity, particularly of the bottom wall being of advantage.

In the operation of the system and in accordance with the method which is the subject of my invention the boats which are about to be loaded with fuel oil, the bilges of which are therefore filled or substantially filled with water which must be removed to provide space for the oil, are brought to the discharge stations being tied to the piling as to a wharf the preferred manner of placing and holding the boats being diagrammatically illustrated in Figure 1, which includes anchor piles 32, about which the boats' cables are passed. The flexible hose 19 at the particular station to which the ship is made fast is then connected by its coupling 20 to the discharge of the bilge pump, the valve 18 at the station and one of the valves 27 being opened to form a connection from the bilge of the boat to one of the settling receptacles the pump is then started and the bilge water pumped into the settling basins or receptacles until the same is filled or the water is exhausted. When one tank is filled the corresponding valve 27 is closed and the valve to another tank which is empty is opened. In this manner a number of boats, depending on the number of stations and the number of tanks, can be very promptly emptied of bilge or tank water and the water retained for recovery of the sludge, oil, etc., and this without delay or expense in excess of that involved in pumping the bilge water overboard in accordance with the present practice.

When a settling basin is filled the liquid accumulated is allowed to stand for a sufficient period to permit the water to separate by gravity, the refuse oil, or sludge, forming in a scum on the top. The gate is then opened forming an outlet at the bottom for the escape of the water. This operation is performed by an attendant who watches the flow and closes the gate leaving a small amount of water at the bottom to prevent the sludge from sticking to the bottom of the basin or tank. The sludge is then removed by running or pumping and is utilized in the manufacture of asphalt, briquetting or refining and other products.

In this way contamination of the water is avoided not only without expense but with considerable incidental profit.

In Figure 1 I have illustrated a filling station in connection with my bilge water disposal and sludge recovery system, the same consisting of a suitable tank 50 on the shore in the vicinity of the settling basins, a pump 52, suitable piping 53 leading from the pump delivery to each of the discharge stations, a riser 55 from the oil pipe to the platform 16 of the discharge station and a hose 57 connected to the pipe. I also preferably provide a shut off valve 59 adjacent the tank to prevent loss in case of damage to the pipe or to shut off the flow of oil when the pipe is opened for any purpose.

The combination of the bilge water discharge and sludge recovery system with an oil dispensing system as illustrated is considered to be of great advantage in the point of time saving as it dispenses with the necessity for stopping at an oil filling station in addition to tying up at a discharge station for the purpose of discharging bilge water as foresaid.

In Figures 4 and 5 I have shown a battery of settling tanks or basins 60 in the form of drums or cylinders of boiler iron or similar material. These tanks or basins are each connected to a main pipe 61 which leads preferably under water, the tank 60 being near the shore as shown in Figure 5, to branch pipes 62 which lead to the discharge stations as already described or more correctly from the discharge stations.

In the form shown the main pipe 61 terminates near the tanks or basin in a fitting 63 to which individual pipes 64 lead to each of the tanks 60, the said pipe being preferably controlled by a valve 65 and the main pipe being controlled by a valve 66.

To provide for the use of the system in cold climates and in all seasons the tanks 60 as shown are supplied each with a heating coil 66 supplied with steam by way of pipes 67 leading from a supply of live steam 68.

In Figure 4 I have also shown a dispensing tank 70, an oil pump 71 and pipes 72 leading preferably under water to each of the discharge stations as aforesaid. I have also shown in connection with the tank 60 a discharge pipe 72 leading from the bottom of each tank controlled by valve 73. The pipe 72 has an outlet over the water at 74 and an outlet 75 leading to the land side. The discharge pipe 72 may be used to discharge first the settled water and then the sludge. The advantage of having outlets both toward the land and toward the water is that it makes it possible to transport the sludge from the tank either by boat or truck.

I have thus described specifically and in detail my method and apparatus for recovery of sludge from bilge water, the description being specific and in detail, in order that the nature and operation of the same may be clearly understood, however, the specific terms herein are used descriptively rather than in a limiting sense, the scope of the invention being defined in the claims.

What I claim and desire to secure by Letters Patent is:

1. A system for the disposal of bilge water and the recovery of sludge and oil from bilge water consisting of a station accessible to navigable water so the ships to be discharged can come along side the same, a settling tank or basin, a pipe connecting the station to the settling tank, means for connecting the pipe to the liquid in the bilge of a boat and means for pumping the liquid from the bilge through the pipe to the settling tank, the settling tank having means for releasing the water from beneath the sludge and oil.

2. A system for the disposal of bilge water and the recovery of sludge and oil from the bilge water comprising a settling tank, a station so situated that the boats to be discharged can come along side the same, a pipe connecting the station to the settling tank, a flexible hose at the station, means for connecting the same to the discharge of the bilge pump and means for withdrawing the water from the settling tank beneath the oil or sludge.

3. A system for the disposal of bilge water and the recovery of sludge and oil from bilge water comprising a settling tank, a station so situated that ships to be discharged can come along side, a sunken pipe connecting the station to the settling tank, a riser at the station connecting the sunken pipe to the station above the level of the water, a flexible hose connected to the riser, the hose being adapted for connection to the bilge pump of the boat.

4. A system for the disposal of bilge water from ships and the recovery of sludge and oil from bilge water consisting of means for discharging bilge water, a settling tank, a pipe leading to the settling tank from a point accessible to the ships, means connecting the pipe to the bilge discharge of a ship and means for releasing the water from the tank beneath the sludge and oil.

5. In a system for the disposal of bilge water and the recovery of sludge and oil from bilge water from ships, a plurality of settling tanks or basins, pipes leading thereto and means connecting the same to the bilge, each tank having an inclined bottom and means for releasing liquid from the low point of the tank or basin.

6. In a system for the disposal of bilge water from ships and the recovery of sludge and oil from bilge water, a plurality of settling tanks, pipes leading thereto and means connecting the same to the bilge, each tank having the bottom inclined downward toward the point of connection and means for releasing liquid from the low part of the tank, the tanks being substantially triangular, the low point being adjacent the vertex.

7. A system for the disposal of bilge water from ships and the recovery of sludge and oil from bilge water, consisting of a plurality of settling tanks having inclined bottoms, the tanks being substantially triangular, the vertices being adjacent the low point of the incline, means for releasing liquid adjacent the low point, a discharge station accessible to navigable water, a sunken pipe connecting the discharge station to the settling tank, a valve controlling the connection to each settling tank, a riser at the discharge station extending from the sunken pipe to a point above the surface of the water, a flexible hose connected to the riser and means for connecting the flexible hose to the discharge of the bilge pump of a ship.

8. The method for the disposal of bilge water and the recovery of sludge and oil from bilge water which consists in passing the sludge and oil from the bilge into a suitable settling container, retaining the sludge in a static condition permitting the water to settle therefrom, forming the sludge and oil into a scum and removing the water from beneath the scum.

9. In a system for the disposal of bilge water a bilge pump and recovery of sludge and oil from bilge water, a plurality of settling tanks or basins, pipes leading thereto and means connecting the same to the discharge of the bilge pump of a boat, a tank being provided with a heating coil and means for providing steam to the same.

Signed by me at Baltimore, Maryland, this 23rd day of January, 1922.

WILLIAM C. ROBINSON.

Witnesses:
PORTER H. FLAUTT,
CARRIE M. REELY.